United States Patent
Belden

(10) Patent No.: US 10,450,466 B2
(45) Date of Patent: Oct. 22, 2019

(54) MULTILAYER COATING WITH VISUAL EFFECT

(71) Applicant: Polynt Composites USA, Inc., Carpentersville, IL (US)

(72) Inventor: Ryan Belden, Liberty, MO (US)

(73) Assignee: Polynt Composites USA, Inc., Carpentersville, IL (US)

( * ) Notice: Subject to any disclaimer, the term of this patent is extended or adjusted under 35 U.S.C. 154(b) by 316 days.

(21) Appl. No.: 15/294,024

(22) Filed: Oct. 14, 2016

(65) Prior Publication Data

US 2017/0107377 A1   Apr. 20, 2017

Related U.S. Application Data

(60) Provisional application No. 62/242,894, filed on Oct. 16, 2015.

(51) Int. Cl.
| | | |
|---|---|---|
| *C09D 5/00* | (2006.01) | |
| *B29C 37/00* | (2006.01) | |
| *C09D 167/06* | (2006.01) | |

(52) U.S. Cl.
CPC ............ *C09D 5/00* (2013.01); *B29C 37/0032* (2013.01); *C09D 167/06* (2013.01); *B29C 2037/0035* (2013.01)

(58) Field of Classification Search
CPC .................................................... C09D 167/06
See application file for complete search history.

(56) References Cited

U.S. PATENT DOCUMENTS

| | | | | |
|---|---|---|---|---|
| 4,497,918 A | * | 2/1985 | Wason | C08K 3/36 523/207 |
| 6,521,692 B1 | * | 2/2003 | Ozu | B43K 5/005 401/209 |
| 6,720,065 B1 | * | 4/2004 | Cosentino | B32B 27/00 428/212 |
| 2001/0010367 A1 | | 8/2001 | Burnell-Jones | |
| 2005/0287354 A1 | | 12/2005 | Jennings et al. | |
| 2007/0249742 A1 | | 10/2007 | Howie, Jr. et al. | |
| 2011/0123750 A1 | | 5/2011 | Toth et al. | |
| 2012/0225190 A1 | | 9/2012 | Steenhoek et al. | |
| 2015/0166760 A1 | | 6/2015 | Trummer et al. | |

FOREIGN PATENT DOCUMENTS

WO    WO2007057372    5/2007

OTHER PUBLICATIONS

International Search Report and Written Opinion for PCT/US2016/057091 dated Dec. 30, 2016.
Extended European Search Report for European Patent Application No. 16856297.3 dated Apr. 24, 2019, 6 pages.

* cited by examiner

*Primary Examiner* — Kuo Liang Peng
(74) *Attorney, Agent, or Firm* — Neal, Gerber & Eisenberg LLP

(57) ABSTRACT

Embodiments of the invention relate generally to the field of multilayer color coatings, and more particularly to multilayer coatings comprising one or more gel coat layers and visual effect pigments.

20 Claims, No Drawings

MULTILAYER COATING WITH VISUAL EFFECT

CROSS-REFERENCE TO RELATED APPLICATIONS

This application claims the benefit of U.S. Provisional Application No. 62/242,894, filed on Oct. 16, 2015, which is incorporated herein by reference in its entirety.

FIELD OF THE INVENTION

Embodiments of the invention relate generally to the field of multilayer color coatings, and more particularly to multilayer coatings comprising one or more gel coat layers and visual effect pigments.

BACKGROUND

Gel coats are widely used in numerous applications as the external surface layer of composite molded articles. Gel coats are typically found on composite articles that are exposed to the environment requiring moisture resistance, resistance to cracking and similar properties, or articles that require a strong, flexible, abrasion and impact resistant surface and/or a smooth glossy finish. Examples of such articles include boat hulls, bath tub enclosures, pools, spas, and body panels on cars and trucks, among others.

Gel coated articles are typically formed by spraying a gel coat composition from a high pressure spray gun onto the inside surface of an open mold, optionally applying one or more other materials, and applying a laminating resin for the composite article onto the gel coat or intermediate materials. The forming method typically includes curing the gel coat and then removing the cured gel coated article from the mold. Gel coated articles can also be fabricated by applying the composite materials into a multi-part mold, injecting or applying the gel coat composition, closing the mold, curing the gel coat and then removing the cured gel coated article from the mold.

Gel coats for composite articles are typically formulated from a thermosetting base resin system such as unsaturated polyester, acrylate and urethane type resins with incorporated fillers, pigments and other additives. The gel coat should exhibit low viscosity at high shear to allow for ease of application to the mold, but also resist sagging or running after it is applied. Another important property of gel coats is surface tackiness and cure time.

Typically, the gel coat resin is mixed with reactive, polymerizable monomers such as styrene or methyl methacrylate (MMA), which are also used to reduce resin system viscosity in order to apply the gel coat by spraying. Conventional gel coat compositions contain 35 to 45 wt % of reactive monomers and other volatile organic compounds (VOCs). The presence of high amounts of styrene and other VOCs results the emission of styrene vapors and other hazardous air pollutants (HAP), which are closely regulated by government regulations.

US 20010010367 A1 discusses luminescent polymers prepared from compositions comprising thermosetting unsaturated polyesters, suspending fillers and phosphorescent pigments and utilized to make gel coated articles and molded, cast and fiberglass reinforced plastic (FRP) articles. The luminescent polymers are said show bright and long-lasting photoluminescent afterglow, strong thermostimulation of afterglow by heat and electroluminescent properties.

US 20070249742 A1 discloses a method for substantially diminishing or essentially eliminating a visible knitline in an article derived from a resinous composition comprising at least one thermoplastic resin and at least one special visual effect additive. It discusses visual effect additives comprising mineral flakes or metallic pigment which may be in the form of flakes. Metallic pigments of various metals and mean particle size ranges are discussed.

US 20110123750 A1 discusses a gel coat composition, in particular marine gel coat compositions, a process for their manufacture, and their use to coat surfaces of articles exposed to light, water and solvents. The gel coats incorporate a precipitated silica having a BET surface of from 150 to 250 m$^2$/g, a SiO$_2$ content of more than or equal to 98.5% by weight, and a Na$_2$O content of less than or equal to 0.5% by weight.

US 20120225190 A1 discusses a method for obtaining characteristics of a target coating layer. Specifically, a clearcoat layer is provided over a target coating layer for measuring color and appearance characteristics of the target coating. The clearcoat layer can comprise materials from renewable resources. The application is also directed to a system for obtaining characteristics of the target coating layer.

US 20150166760 A1 discusses metallic effect pigments with coating, comprising a platelet-shaped substrate, where the coating comprises at least one hybrid inorganic/organic layer, the hybrid layer having at least partly an inorganic network that has one or more inorganic oxide components, and having at least one organic component, the organic component being at least partly an organic oligomer and/or polymer which is covalently bonded at least partly to the inorganic network via one or more organic network formers. The application also discusses a method of producing these metallic effect pigments, and to their use.

SUMMARY OF THE INVENTION

As one aspect of the present invention, a multilayer coating having a visual effect is provided. The coating comprises (a) a high clarity gel coat layer comprising an unsaturated polyester and a thixotropic agent having a size and surface that does not significantly impair the clarity of the gel coat layer; (b) a visual effect layer comprising a clear gel coat and a visual effect pigment; and (c) a color layer comprising a gel coat and a simple pigment.

As another aspect, a method of manufacturing a multilayer coating having a visual effect is provided. The method comprises applying a high clarity gel coat resin as a layer to a mold, wherein the resin is a high clarify gel coat resin comprising a thixotropic agent having a size and surface that does not significantly impair the clarity of the gel coat layer. The method also comprises applying a visual effect resin directly or indirectly to the clear gel coat resin layer to form a visual effect layer. The method also comprises applying a color resin directly or indirectly to the visual effect layer to form a color layer. In some embodiments of the method, the high clarity gel coat resin is at least partially cured before the visual effect resin is applied and/or the visual effect resin is at least partially cured before the color resin is applied. One or more of the high clarity gel coat resin, the visual effect resin, and the color resin can be applied by spraying. The method can further comprise applying a thermosetting resin or a thermoplastic resin to the color layer and/or adhering the multilayer coating to a substrate to form an article.

As yet another aspect of the present invention, articles coated with the present multilayer coatings are provided. For example, the article may comprise a composite (such as a fiber-reinforced composite) which is at least partially coated by the multilayer coating having a visual effect.

The article can be selected from the group consisting of watercrafts, wind mills, swimming pools, tubs, showers, sanitary ware, tanks, pipes, tanks, ducts, fume stacks, build panels, ships, electrical parts, aircraft components, and electronic components. For example, the high clarity gel coat comprises a polyester resin and wherein the article is a watercraft hull.

As another aspect of the present invention, a visual effect gel coat resin is provided. The visual effect gel coat resin comprises from 70 to 90 wt % high clarity gel coat resin and less than 2% at least one silica having a BET of 260-350 $m^2/g$, based on the total weight of the composition.

In the foregoing aspects of the invention, the visual effect get coat resin can include at least one unsaturated polyester resin or other cross-linkable gel coat resin.

In the foregoing aspects of the invention, the visual effect can be selected from the group consisting of sparkle, metallic effect, pearlescent effect, gloss, distinctness of image, coarseness, glint, glitter, texture, or a combination thereof. For example, a preferred visual effect is a sparkle effect (also referred to as sparkling). The visual effect pigment can be a metal-coated glass particle and/or can have a particle size distribution of 35-150 microns. The high clarity gel coat layer can comprise silica (preferably fumed silica) in an amount that is less than 2% by weight. Alternatively or additionally, the high clarity gel coat layer comprises silica having a BET surface area of 260-350 $m^2/g$ or 280-330 $m^2/g$.

In some embodiments, the high clarity gel coat layer is formed by curing an unsaturated polyester resin containing styrene monomer and (meth)acrylic acid and/or an alkyl (meth)acrylate. One or more of the high clarity gel coat layer, the visual effect layer, or the color layer can comprise one or more phthalate containing polyesters, vinyl containing polyesters or methyl methacrylate containing polyesters.

DEFINED TERMINOLOGY

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art considers the cancellation to be acceptable.

As used in the specification and the appended claims and in addition to its ordinary meaning, the term "approximately" means to within an acceptable limit or amount to one having ordinary skill in the art. For example, 'approximately the same' means that one of ordinary skill in the art considers the items being compared to be the same.

Relative terms, such as "above," "below," "top," "bottom," "upper" and "lower" may be used to describe the various elements' relationships to one another, as illustrated in the accompanying drawings. These relative terms are intended to encompass different orientations of the coatings and/or articles in addition to the orientation described. For example, if the article were inverted, an element described as "above" another element, for example, will now be "below" that element. Similarly, if the article were rotated by 90°, an element described "above" or "below" another element will now be "adjacent" to the other element; where "adjacent" means either abutting the other element, or having one or more layers, materials, structures, etc., between the elements.

"Visual effect" means sparkle, metallic effect, pearlescent effect, gloss, distinctness of image, coarseness, glint, glitter, texture, or a combination thereof.

Layers, resins, may be directly or indirectly attached to another surface. "Indirect" attachment of one layer to another means that an intermediate layer is between them. For example, a first clear layer may be indirectly attached to a color layer when second clear layer is between the first clear layer and the color layer.

Unless otherwise specified herein, the term "viscosity" refers to the viscosity of a polymer in monomer at 25° C. (77° C.) measured in centipoise (cps) using a Brookfield RV model viscometer. The viscosity under high shear is measured by a cone and plate (CAP) viscometer at a shear rate of 10,000 l/s. The term "NVM" refers to non-volatile material dispersed in a volatile substance (e.g., monomer) as measured according to ASTM D1259.

All percentages in this disclosure are by weight unless otherwise indicated.

DETAILED DESCRIPTION

In the following detailed description, for purposes of explanation and not limitation, representative embodiments disclosing specific details are set forth in order to provide a thorough understanding of the present teachings. Descriptions of known systems, devices, materials, methods of operation and methods of manufacture may be omitted so as to avoid obscuring the description of the example embodiments. Nonetheless, systems, devices, materials and methods that are within the purview of one of ordinary skill in the art may be used in accordance with the representative embodiments.

According to an aspect of the present invention there is provided a multilayer coating comprising at least one high clarity gel coat layer and at least one visual effect layer, wherein the clear barrier layer is in use, disposed atop the sparkle effect pigment layer whereby the clear barrier layer protects the structure and appearance of the sparkle effect layer.

The present coatings and articles are suitable for the marine, transportation, and architectural industries and structures. For example, the coatings may be applied to kiosks, automated teller machines, wall panels, and other articles. They provide visual effects similar to popular automotive metallic and pearl finishes. The present coatings and articles include an intermediate layer comprising one or more visual effect additives. The present coatings and articles include one or more gel coat layers, for example three layers, and the present methods include one or more layer application steps, for example at least three layer application steps. The present methods create a deep, rich, sparkling finish that enhances appearance and provides a desired visual effect for marine and transportation surfaces.

In some embodiments, the present coatings comprise at least three layers, namely a clear layer, a visual effect layer and a base color layer.

In some embodiments, the visual effect layer is a decorative layer, containing one or more visual effect pigments and optionally other decorative or ornamental agents provided to impart a desired visual or aesthetic appearance. The decorative or ornamental agents can include, but are not limited to, conventional pigments, particles and chips. In some embodiments, the multilayer coating comprises three layers, each of which is 5-12 mils, alternatively 7-10 mils.

The present coatings and articles comprising one or more gel coat compositions disclosed here. They can be used in making a gel coated multi-layer coating. The gel coat compositions, particularly those used in the most exterior layer(s) and/or in the visual effect layer, have high clarity, for example a clarity of 94 or higher as measured on a white portion of a byko chart.

In some embodiments, one or more layers of the present coatings or articles is a clear get coat. High clarity gel coat resins are available for Polynt Composites USA, Inc. In some embodiments, the clear layer is a clear polyester gel coat from an unsaturated polyester resin that yields a high clarity gel coat upon curing and/or cross-linking. For example, STYPOL 040-0901, STYPOL 040-0946, and other resins from Polynt Composites USA, Inc. can be used as a component for a clear gel coat. As another example, a clear polyester gel coat layer can be formed from resins comprising one or more phthalate containing polyesters, vinyl-containing polyesters or (methyl) methacrylate-containing polyesters. More preferably, the clear polyester gelcoat comprises a phthalate containing polyester particularly a phthalate containing polyester derived from an isophthalic neopentyl glycol (iso-NPG).

The high clarity gel coat resin or layer may comprise unsaturated polyester resin as 40 to 95%, or 65 to 85%, of the total gel coat composition. The clear coat resin or layer may comprise reactive monomer (such as styrene) as 20 to 60%, or 30 to 45% of the total gel coat composition. The clear coat resin or layer may comprise 1 to 10%, alternatively 3 to 8% (meth)acrylic acid, (meth)acrylate or other ethylenically unsaturated carboxylic acid. The high clarity gel coat resin or layer is one having low color, high clarity, and high weather and water resistance; an example of such as resin is STYPOL Gold Series Resins available for Polynt Composite USA, Inc., Carpentersville, Ill.

In some embodiments, the multilayer coating includes a high clarity gel coat layer having a clarity of at least 94 on a white portion of a byko chart and/or a clarity of less than 26 on the black portion of a byko chart. Other suitable characteristics for a high clarity gel coat resin include a viscosity of 3,200-4,500 cps and a thixotropic index of 4-7.5.

Unsaturated polyesters of use in the present coatings are the reaction products of polycarboxylic acids or anhydrides and one or more polyhydric alcohols dissolved in a cross-linking monomer containing an inhibitor to prevent cross-linking until the resin is used by the fabricator. Unsaturated polyesters are the condensation product of one or more unsaturated dicarboxylic acids or anhydrides, one or more aromatic dicarboxylic acids or anhydrides and one or more polyhydric alcohols in combination with a polymerizable vinylidene monomer. One or more of the components of the polyester must be ethylenically unsaturated, preferably a polycarboxylic acid component.

Typical unsaturated acids include dicarboxylic acids and anhydrides such as maleic anhydride, maleic acid, fumaric acid, methacrylic acid, acrylic acid, itaconic acid and citraconic acid. Maleic anhydride is the most economic derivative, although fumaric acid can be substituted, yielding resins with the same properties but some subtle structural differences. The term (meth)acrylic acid refers to acrylic acid, methacrylic acid, or combinations thereof. In most commercial formulations, the reactivity of the polyester polymer is derived primarily from the maleic anhydride component. Maleate and fumarate based resins utilizing maleic anhydride, fumaric acid or maleic acid or mixtures thereof are preferred in the present invention. Acrylic acid and methacrylic acid modified polyester resins also find use. The degree of unsaturation is varied by including a saturated dibasic acid (which includes aromatic acids insofar as polyesters are concerned) such as phthalic anhydride, isophthalic acid, phthalic acid, chlorendic anhydride, tetrabromophthalic anhydride, tetrachlorophthalic anhydride, tetrahydrophthalic acid and anhydride, adipic acid, succinic acid, suberic acid, sebacic acid, azelaic acid, terephthalic acid, etc. Orthophthalic (derived from phthalic anhydride or phthalic acid) and isophthalic (derived from isophthalic acid) based polyester resins and their substituted and halogenated derivatives are particularly preferred in the practice of the present invention. DCPD modified phthalic and/or isophthalic resins may also find use. Examples of polyhydric alcohols include glycols, such as propylene glycol, ethylene glycol, neopentyl glycol, diethylene glycol, dipropylene glycol, 1,4-butanediol, dibromoneopentyl glycol, 2,2,4-trimethyl-1,3-pentanediol, 1,3-butanediol, 1,5-pentanediol, 1,3-propanediol, hexylene glycol, triethylene glycol, tetraethylene glycol, dicyclopentadiene hydroxyl adducts; propylene oxide; triols such as trimethylol ethane, trimethylol propane, trimethylol hexane, and hexane triol; Bisphenol A ethers and Bisphenol A adducts (such as bisphenol dipropoxy ether and the adduct of Bisphenol A with ethylene oxide), hydrogenated Bisphenol A and brominated bisphenols; and others.

The ethylenically unsaturated polyester is usually a semi-rigid polyester or flexible polyester although mixtures of these can be used with rigid polyesters. The preferred polyesters form copolymerizates with vinylidene monomers. The preferred vinyl monomer is styrene. Styrene when compared with other commercial monomers usually offers equivalent properties at much lower cost. Certain monomers enhance specific properties, for example diallyl phthalate and triallyl cyanurate extend the thermal durability required in certain electrical components. Other monomers include vinyl aromatics such as vinyl toluene, alpha-methylstyrene, divinylbenzene, p-t-butylstyrene, o-chlorostyrene and dichlorostyrene, the alkyl esters of alpha, beta-ethylenically unsaturated monocarboxylic acids such as methyl methacrylate, methylacrylate, ethylacrylate and 2-ethylhexylacrylate, and the vinyl esters such as vinyl acetate and vinyl proprionate. They find some utility, usually in combination with styrene. The vinyl esters are generally less suitable for the practice of the present invention. Preferably, the ethylenically unsaturated polyesters comprise from about 30 to 80 percent of the polymerizable resin-forming components, with the remaining 20 to 70 percent being composed of the crosslinking vinylidene monomers. Control of the amount of styrene is particularly useful in obtaining high gloss surface finishes.

The present coatings and articles include at least one resin for each layer. The composition of the resins for the various layers will differ based on the desired appearance. A low viscosity (500-1000 cps) resin is used so it can be easily filled and will allow entrapped air to escape. Usually a high-impact grade is preferred to insure freedom from chipping caused by impact or thermal stresses. Concentration in the complete formulation is typically 25-95% by weight.

The resins and compositions for each of the layers can include various other components besides the unsaturated polyester, such as one or more fillers. Examples of fillers are calcium carbonate (including fine synthetic high purity grades used for high-viscosity, nonsag coats), hydrated aluminum silicate and other silicates, clay, ground limestone, mica, talc, aluminum trihydrate, barium sulfate, nepheline syenite, feldspar, carbides, oxides, metal powders and carbon, depending on the particular physical, chemical, or electrical properties desired. Fillers are used to reduce resin shrinkage, lower the exotherm, increase the hardness, increase the thermal conductivity and dimensional stability, increase the fire retardance, or change the density and opacity of the resin. The filler concentrations may range from 5-75% by weight.

The present coatings and articles, or the layers or resins comprising the coatings or articles, can include one or more thixotropic agents. For example, thixotropic agents include colloidal silica, precipitated silicas and/or fumed silica. Other thixotropic agents include magnesium aluminum silicate clays (such as bentonite). Thixotropic agents are included to prevent sagging and running of the gel coat when applied to vertical surfaces and void-free dense surfaces. In some embodiments, the thixotropic agent is a powder, such as a powder having a Brunauer-Emmett-Teller (BET) surface area of 260-350 $m^2/g$, alternatively 280-330 $m^2/g$. In some embodiments, the thixotropic agent is selected from silicas having a BET surface area of 260-350 $m^2/g$, alternatively 280-330 $m^2/g$. The BET surface area can be determined by ISO 9277 "Determination of the specific surface area of solids by gas adsorption—BET method", or other suitable analytical method. The ISO 9277 procedure is used to determine the specific N2 surface area of silicas and silicates according to the BET procedure. The measured value is determined by cryogenic adsorption of nitrogen at well defined partial pressures. The analysis is accomplished as multipoint determination and shows in the partial pressure range (p/p0) of 0.05-0.2 with measuring of altogether 5 points a linear behaviour.

Fumed silica (CAS number 112945-52-5), also known as pyrogenic silica because it is produced in a flame, comprises microscopic droplets of amorphous silica fused into branched, chainlike, and/or three-dimensional secondary particles which then agglomerate into tertiary particles. Fumed silica has an extremely low bulk density and high surface area. Its three-dimensional structure results in viscosity-increasing, thixotropic behavior when used as a thickener or reinforcing filler. Precipitated silica is a silica (SiO2) produced by precipitation from a solution containing silicate salts.

Thixotropic agents are used to minimize filler settling and increase pigment efficiency. They can be used in concentrations of 0.1-15% alternatively 0.25 to 5%, alternately 0.5 to 1.75% by weight. Other known thixotropic agents include hydrogenated castor oil and aliphatic acid amides. The thixotropic characteristics of gel coats should be precisely controlled in view of the thickness of the deposited film and the tendency of such films to sag. The gel coat should be uniformly thixotropic so as to eliminate dripping when applied to vertical surfaces and void-free dense surfaces. Gel coat formulations typically contain accelerators, as extension of gel time can impair the cure of the gel coat in the allotted time, with subsequent application of the resin laminate causing the gel coat to swell and wrinkle. Special attention must be paid to gel-time drift caused by the absorption and deactivation of a cobalt accelerator by pigments and by thixotropic agents such as fumed silica.

The present coatings and articles can include one or more simple pigments. Simple pigments refer to pigments that do not provide a visual effect beyond acting as coloring agents. They are frequently used in gel coats in concentrations of 0-10% by weight. In the present coatings and articles, the color layer or base gel coat layer can comprise one or more simple pigments.

The resins used for the present coatings and articles can include one or more solvents. Solvents such as acetone can be added to a formulation to thin it and for spraying consistency. A minimum amount of solvent is used (or preferably no solvent) since solvents can pose performance, manufacturing and environmental risks or concerns.

Other useful components in the present resins include inhibitors, cure accelerators, leveling agents and defoaming agents.

The present coatings and articles include one or more visual effect pigments. For example, a visual effect pigment provides color and one or more other visual effects such as sparkle, metallic effect, pearlescent effect, gloss, distinctness of image, coarseness, glint, glitter, texture, or a combination thereof. Among the preferred visual effect pigments are sparkle effect pigments and metal-coated glass particles. Other visual effect pigments are mineral flakes or metallic pigment which may be in the form of flakes Plastic articles having a sparkling look, a metallescent or metal-like look, a true metal appearance, or any angular metameric appearance are desirable in many instances. Plastic articles having a sparkling or metallescent look can be created by incorporating a special visual effect additive such as free metal flakes into a plastic article at such loading that the individual flakes can be distinguished by the naked eye, resulting in an article with a sparkling or metallescent appearance. Plastic articles having a true metallic look can be created by using a much higher loading of free metal flakes.

In some embodiments, visual effect pigments are selected from the group consisting of glass flakes, metallic pigments, metal flakes, aluminum pigment, crosslinked polymer particles, crosslinked acrylic resin, and mixtures comprising at least one of such additives.

Example of visual effect pigments are BASF luster pigments, which are transparent and reflect light because of their smooth surfaces and high index of refraction. Larger particle sizes can provide a sparkle effect as the visual effect. Light reflected from the platelets creates a sense of depth and a luster that varies with particle size—smaller particles impart a satin sheen while larger particles create a more sparkly or glitter-like effect. Some of BASF's MEARLIN special effect pigments have a multiple color play and dynamic color travel or "flop" in which the color changes with the viewing angle. Although these pigments are non-metallic, they can give finishes a metallic look. MEARLIN pearlescent pigments from BASF are mica platelets coated with titanium dioxide and/or iron oxide that provide both color and visual effects to a variety of coatings, plastics and printing ink applications.

As other examples of visual effect pigments, LUXAN pearlescent pigments from Eckart comprises synthetically produced glass which is coated with a layer. As one example, LUXAN C001 pigments are small glassflakes that provide transparent a shimmering effect as a visual effect. Other glass pearl pigments from Eckhart that may be used as visual effect pigments include LUXAN D001, LUXAN E001, LUXAN F001, LUXAN E221, LUXAN E241, LUXAN C261, LUXAN E261, LUXAN C393, LUXAN D393, LUXAN B241, LUXAN B502, LUXAN B522, LUXAN B542, LUXAN D502, LUXAN D522, LUXAN D542, LUXAN B512, LUXAN D512, and LUXAN B393.

Preferred metallic pigments are based on metals of Groups 4, 6, 8, 9, 10, 11, 13, and 14 of the periodic table of the elements. Metallic pigments may be colored. Examples of these metallic pigments include aluminum, bronze, brass, chromium, copper, gold, iron, molybdenum, nickel, tin, titanium, zinc and the like. Metallic pigment may be produced by shredding to give a broad distribution of irregular particle shapes, or by die-cutting to give more limited particle size and shape. Glitter, which is a special type of aluminum pigment produced from foil, may also be utilized. The foil, typically rolled to gauges of less than 0.025 mm, is typically cut into square, rectangular or hexagonal shapes in sizes from 0.2 to about 3 mm, and typically coated with a transparent epoxy lacquer to halt oxidative dulling of the foil. Glitter, with its large particle sizes, can produce discrete highlights of metallic sparkle. Gold bronzes are typically alloys of copper and zinc with a small amount of aluminum to reduce oxidation. The range of gold colors is produced by varying proportions of major alloy components. In various examples a green gold alloy typically contains 70 percent copper, and color becomes redder as the percentage of copper is increased; 90 percent copper produces pale gold; deep gold is made by controlled oxidation of the alloys. Gold bronzes are usually utilized in flake form, with coarser grades giving more brilliance. Metallic flakes such as copper must be utilized with care, however, as they may be susceptible to heat, moisture and corrosives. The metallic pigment may optionally be coated, for example, with rosin or fatty acids, such as oleic or linoleic acid. Optionally, the metallic pigment may be initially in granular form comprising a carrier material, which may comprise at least one polymer. Suitable carrier materials comprise mineral oil, wax, polyethylene, oxidized polyethylene, poly(methyl methacrylate), or the like. In granular form the metallic pigment typically represents about 70-80% of the granule with the remainder being the carrier. Said pigments can be used to produce or enhance bright sparkle as well as hammer and leafing finishes in the present multilayer coatings and articles. Suitable visual effect pigments may also comprise a plurality of microsphere beads having a diameter in a range of about 1 to about 1300 microns, typically in a range of about 1 to about 850 microns, and more typically in a range of about 10 to about 200 microns. In a particular embodiment the beads are comprised of glass and have a diameter of about 50 microns. In another particular embodiment the beads are comprised of barium titanate.

Coatings containing visual effect pigments, such as light absorbing pigment, light scattering pigments, light interference pigments, and light reflecting pigments are well known. Metallic flake pigments, for example aluminum flakes, are examples of such effect pigments and have been used for decoration of automotive surfaces, such as for example by reason of their imparting a differential light reflection effect, usually referred, to as "flop", as well as flake appearance effects, which include flake size distribution and the sparkle imparted by the flake as well as the enhancement of depth perception in the coating. The flop effect is dependent upon the angle from which the car body is viewed. The degree of the flop effect achieved, is a function of the orientation of the metallic flakes with respect to the outer surface of the coating. The degree of sparkle is a function of the flake size, surface smoothness, orientation, and uniformity of the edges. Metallic coatings usually also contain pigments, generally of a light absorbing rather than a light scattering type. Any light scatter from the pigments or the flakes themselves, e.g., from the flake edges, diminishes both the flop and the sparkle of the coating.

The visual effect pigments typically have a mean particle size ranging from about 1 to about 3500 microns, preferably from about 1 to about 500 microns, preferably from about 10 to about 300 microns, and still more preferably from about 10 to about 100 microns.

The particle size distribution of visual effect pigments can impact the visual effect. For example, larger and coarser particles tend to provide sparkle and gloss, which smaller and finer particles tend to provide more structure and hiding power. In some embodiments, the visual effect pigments have a coarse particle size distribution, for example, a particle size distribution of 35 to 150 microns, or of 10 to 65 microns.

In some embodiments, the visual effect pigments layer are present in a visual effect layer of a coating. The visual effect layer can be a sparke effect layer. The visual effect layer can also contain one or more other pigments or reflective particles.

Useful simple pigments include, for example, inorganic pigments. Exemplary inorganic pigments include metal oxide hydroxides and metal oxides such as zinc oxide, titanium dioxides, iron oxides, chromium oxides, europium oxide, cerium oxide, colored alumina oxide particles or the like. Inorganic pigments can also include carbonates such as calcium and cobalt carbonate; titanates based on the rutile (chromium antimony titanate and nickel antimony titanate), spinel (cobalt and iron titanates), priderite, and pseudo-brookite pigment structures. Other exemplary pigments include (i) aluminates such as cobalt aluminates and cobalt chromium aluminates; (ii) chromites such as copper chromite black and cobalt chromite green; (iii) ferrites such as the pure ferrite spinels that contain magnesium and zinc, mixed chromite/ferrite spinels, and mixed chromium iron pigments identified as Pigment Green 17 or Pigment Brown 29; (iv) sulfides and sulfates such as cadmium sulfides and sulfoselenides, cerium sulfides, zinc sulfide, barium sulfate, and strontium sulfate; (v) bismuth pigments such as bismuth vanadate, yttrium and cerium substituted bismuth oxide to form mixed oxides; (vi) chromates; (vii) silicates such as ultramarine and zirconium silicate pigments; (viii) cyanides such as the Fe(II)Fe(III) cyano complexes; (ix) calcium, lanthanum, and tantalum oxide-nitrides; manganese and cobalt phosphates; (x) carbon black; (xi) luminescent pigments such as sulfides and sulfoselenides, alkaline-earth sulfides and sulfoselenides oxysulfides, borates, aluminates, gallates, silicates, germinates, halophosphates and phosphates, oxides, arsenates, vanadates for example yttrium vanadates, niobates and tantalates, sulfates, tungstates and molybdates, alkali-metal halides, alkaline-earth halides, including anti-stokes shift pigments, oxyhalides; (xii) quantum effect pigments such as nanoscale silicon with a particle size less than 5 nanometers; semi-conducting luminescent nanoparticles such as $Cd_3P_2$, and PbS; storage phosphors such as CaS:Eu,Sm.

Phosphorescent materials include ZnS:Cu and SrS:Bi. Phosphors that can be used include those based on $MAl_2O_4$ wherein M is a metal such as calcium, strontium, barium, or a combination comprising at least one of the foregoing metals. The matrix can be doped with europium and dysprosium.

Useful organic pigments and dyes include acridine dyes, aminoketone dyes, anthracene derivatives, anthraquinones, aryl- or heteroaryl-substituted poly ($C_{2-8}$) olefin dyes, arylmethane dyes, azine dyes, azo dyes, azo lakes, azos, benzimidazolone pigments, benzothiazole, benzoxazole, bis(hydroxyflavones), bis(styryl)biphenyl dyes, bis-benzoxazolylthiophene (BBOT), carbocyanine dyes, carbostyryl dyes, chrysene, coronene, coumarin dyes such as coumarin 460 (blue) and 7-amino-4-methylcoumarin, nile red or the like, cyanine dyes, diazonium dyes, di-azos, di(imminiums), diketopyrrolopyrrole, dioxazines such as dioxazine violet, enthrones, flavanthrones, infrared (IR) absorbers such as IR1000 from ColorChem International Corp., fluorophores such as anti-stokes shift dyes which absorb in the near infrared wavelength and emit in the visible wavelength, fluoroscein, hydrocarbon and substituted hydrocarbon dyes, hydroxyflavones, imidazole derivatives, indanthrone dyes, indigoid dyes, isoindolinones, lactone dyes, lanthanide chelates, metal dithiol complexes, methine dyes, naphthalimide derivatives, nitro dyes, oxazines, perinones, perylenes, phthalocyanine dyes, phthalocyanines, polyazaindacenes, polycyclic aromatic hydrocarbon dyes, porphyrin dyes, pyrazolines, pyrazolones, pyrene, pyrilium, quinacridones, quinone imine dyes, quinophthalones, rhodamine 700, rhodamine 800, rhodamines and all their derivatives, rubrene, scintillation dyes such as oxazole or oxadiazole dyes, squarylium, stilbenes, tetrachloroisoindolinones, tetrazolium dyes, thermochromic pigments, thiazole dyes, thiapyrillium, triarylammonium, thiazinex, thioindigoid dyes, thiophenes, thioxanthenes, triarylmethanes, triarylammoniums, xanthenes, 1,1'-diethyl-2,2'-carbocyanine iodide, 2-(1-naphthyl)-5-phenyloxazole, 2-(4-(4-dimethylaminophenyl)-1,3-butadienyl-3-ethylbenzothiazolium perchlorate, 2-(4-biphenylyl)-5-(4-t-butylphenyl)-1,2,2'-dimethyl-p-quaterphenyl, 2,2-dimethyl-p-terphenyl, 2,2'-p-phenylen-bis(5-phenyloxazole), 2,5-bis-(4-biphenylyl)-oxazole, 2,5-diphenylfuran, 2,5-diphenyloxazole, 3-(2'-benzothiazolyl)-7-diethylaminocoumarin, 3,3'-diethyl-4,4',5,5'-dibenzothiatricarbocyanine iodide, 3,4-oxadiazole, 3,5,3',5'-tetra-t-butyl-p-quinquephenyl, 3-diethylamino-7-diethyliminophenoxazonium perchlorate, 4,4'-diphenyl stilbene, 4-dicyanomethylene-2-methyl-6-(p-dimethyl aminostyryl)-4H-pyran, 7-dimethylamino-1-methyl-4-methoxy-8-azaquinolone-2,7-dimethylamino-4-met-hylquinolone-2, and the like.

In some embodiments, a method of manufacturing a multilayer coating having a visual effect comprises applying a high clarity gel coat resin as a layer to a mold, wherein the resin is a high clarify gel coat resin comprising a thixotropic agent having a size and surface that does not significantly impair the clarity of the gel coat layer; applying a visual effect resin directly or indirectly to the clear gel coat resin layer to form a visual effect layer; and applying a color resin directly or indirectly to the visual effect layer to form a color layer. The high clarity gel coat resin can be at least partially cured before the visual effect resin is applied. Alternatively or additionally, the visual effect resin can be at least partially cured before the color resin is applied. The high clarity gel coat resin, the visual effect resin, and/or the color resin can be applied by spraying.

The methods can also include applying a thermosetting resin or a thermoplastic resin to the color layer and/or adhering the multilayer coating to a substrate to form an article. For example, the substrate can be a surface selected from the group consisting of watercrafts, wind mills, swimming pools, tubs, showers, sanitary ware, tanks, pipes, tanks, ducts, fume stacks, build panels, ships, electrical parts, aircraft components, and electronic components.

In some embodiments, the multi-layer coating is fabricated by applying a thermosetting gel coat composition as an in-mold coating to a surface of a mold; allowing the gel coat composition to cure at ambient temperature to form a partially crosslinked, tacky to tacky-free gel coat; applying a pigment layer; and applying a color layer. The methods can also comprising the steps of applying a material to be molded onto the partially crosslinked gel coat; applying a crosslinkable laminating resin onto said material; and allowing the laminating resin and the gel coat to cure at ambient temperature to a solid, crosslinked, thermoset resin.

The coatings and the articles to be coated include molded articles made of thermosetting, thermoplastic or other materials. In particular the coated, molded articles, optionally fiber-reinforced, are typically are made by spreading a gel coat composition over the surface of a mold having a surface corresponding to the article in negative relief. In some embodiments, the high clarity gel coat layer will be the outermost layer of the molded article and will become exposed to and provide protection from the environment. The gel coat composition resins can be spread across the mold surface by any one of a number of techniques (e.g., brushing, hand lay-up, or spraying). The visual effect resin and color resin are can be applied by the same techniques or different techniques.

In some embodiments, a strengthening plastic support, optionally fiber-reinforced, can then applied behind the partially or fully cured gel coat composition using any one of a number of techniques (e.g., by brushing, hand lay-up, or spraying for open mold processes, or by casting for closed mold processes), and the resulting laminate structure is cured and demolded. Curing can be promoted through the use of free radical polymerization initiators.

The present coatings and layers can be applied with standard gel coating equipment. The layers may be applied wet-on-wet or allowed to film gel between application of layers. A LED light can be used to verify coverage of the visual effect layer. Patching can be done with a clear patching thinner.

The mean particle size can be measured following ISO 13320-1. This testing procedure describes the measurement of particle size distributions of silicas and silicates between 0.04 and 2500 microns by means of laser diffraction. The application of laser diffraction using the Fraunhofer model for the determination of particle sizes is based upon the phenomenon that particles scatter light with different intensity pattern in all directions. The scattering depends on the particle size. The smaller the particles the higher the scattering angles.

The sample being investigated is to presieve by means of a 500 micron sieve before measurement. This is valid for milled product, respectively products without matters >500 micron.

Also provided is a system and kit for forming a high clarity gel coat layer and/or a visual effect layer. In an embodiment, the system is composed of separate containers packaged together, including a container of a high clarity gel coat resin and at least one additive component selected from the group consisting of fillers, pigments and thixotropic agents as described herein for a gel coat; a container of a visual effect pigment; a container of a base catalyst; and directions for combining the contents of the containers to form a high clarity gel coat layer and/or a visual effect layer as described herein.

A system is also provided for forming a multi-layer gel coated color article. A system or kit can include a high clarity gel coat resin, a visual effect resin, and a color resin. In some embodiments, the system is composed of separate containers packaged together, including: a container of a high clarity gel coat resin; a container of visual effect pigment; a container of base color, and a container of a base catalyst; and directions for applying and/or combining the contents of the containers to form a multilayer coating having a visual effect.

EXAMPLES

This example demonstrates that a standard clear cannot be used to generate the desired sparkle effect in a multi-layer coating, but the present multi-layer coating disclosed herein have excellent color and a sparke effect. In this example, four panels were prepared: Experimental Black, Standard Black, Experimental White and Standard White. The testing was two-fold. Fabricating a panel as you would in the field (clear, effect layer, solid color, laminate) for visual determination and drawdowns on a byko chart PA-2810 (available from BYK-Gardner) for quantitative testing. The lab panels were manufactured using a lab-scale suction gun but there are not any special application parameters as far as equipment goes. BYK-Gardner offers drawdown cards and charts for assessing color, opacity and/or clarity of coating materials.

Example 1 describes a resin for producing a clear gel coat layer according to the present disclosure. Table 1 discloses the components and concentrations for an Experimental Clear Gel Coat Resin. The Hydrophilic Pyrogenic Silica (a fumed silica) had a BET of 280-330 $m^2/g$.

TABLE 1

| Component | Conc. |
| --- | --- |
| STYPOL GOLD SERIES RESIN | 79.62997% |
| ANTHRAQUINONE TYPE DYE | 0.00013% |
| UV ABSORBER | 0.25000% |
| TPS SHELF LIFE STABILIZER | 0.50000% |
| POTASSIUM HEX | 0.05000% |
| Hydrophilic Pyrogenic Silica | 1.50000% |
| STYRENE MONOMER | 8.70990% |
| METHYL METHACRYLATE | 8.50000% |
| 12% COBALT | 0.06000% |
| BYK A-500 | 0.30000% |
| DMAA 95% | 0.15000% |
| HQMME/MTBHQ INHIBITOR SOLUTION | 0.05000% |
| ETHYLENE GLYCOL | 0.05000% |
| WITCONOL 2720 | 0.20000% |
| Polydimethylsiloxane | 0.05000% |
| | 100.00000% |

Stypol Gold Series Resins are characterized by low color, high clarity, and high weather and water resistance.

Example 2 describes a resin for producing a gel coat resin for the color layer according to the present disclosure. Table 2 discloses the components and concentrations for the Experimental Neutral Gel Coat Resin:

| FLEX ISO RESIN | 35.017% |
| --- | --- |
| STYPOL ISO NPG | 17.564% |
| FUMED SILICA | 0.180% |
| METHYL METHACRYLATE | 2.041% |
| STYRENE MONOMER | 17.297% |
| UV ABSORBER | 0.510% |
| UV ABSORBER | 0.510% |
| TALC | 23.963% |
| ALUMINUM SILICATE | 1.974% |
| BYK R605 | 0.155% |
| BYKA 560 | 0.510% |
| CU STABILIZER | 0.071% |
| ARQUAD 2C-75 | 0.071% |
| HQMME/MTBHQ INHIBITOR SOLUTION | 0.010% |
| 12% COBALT | 0.025% |
| POTASSIUM | 0.068% |
| COBALT 21% | 0.032% |
| | 100.000% |

Example 3 describes a resin for producing a visual effect layer. Table 3 discloses the components and concentrations for an Experimental Light Silver Resin, which comprises the resin described in Example 1 and LUXAN C001 as the visual effect pigment:

| Example 1 resin | 99.95% |
| --- | --- |
| pearlescent pigment (LUXAN C001) | 0.05% |

Example 4 describes a resin for producing a color layer. Table 4 discloses the components and concentrations for the Experimental Deep Cosmos Resin, which comprises the resin described in Example 2 and several simple pigments:

| Example 2 resin | 91.15% |
| --- | --- |
| 12% COBALT | 0.10% |
| POTASSIUM HEX | 0.05% |
| HQMME/MTBHQ INHIBITOR SOLUTION | 0.10% |
| DMAA 95% | 0.10% |
| STYRENE MONOMER | 1.00% |
| CARBON BLACK COLORANT | 7.00% |
| | 99.50% |

Comparative Example A describes a resin for producing a clear gel coat layer. Table A discloses the components and concentrations for the Standard Clear Gel Coat Resin:

| FLEX ISO/NPG RESIN | 76.622% |
| --- | --- |
| BYKA 560 | 0.508% |
| UV ABSORBER | 0.305% |
| CALCIUM STEARATE | 0.102% |
| HQMME/MTBHQ INHIBITOR SOLUTION | 0.152% |
| FUMED SILICA | 2.315% |
| WITCONOL 2720 | 0.139% |
| 12% COBALT CATALYST 510 | 0.071% |
| ARQUAD 2C-75 | 0.051% |
| CU STABILIZER | 0.051% |
| POTASSIUM HEX | 0.051% |
| DMAA 95% | 0.406% |
| METHYL METHACRYLATE | 6.094% |
| STYRENE MONOMER | 13.133% |
| | 100.000% |

Panels were constructed by spraying seven mils of the clear coating resin, seven mils of the visual effect resin and seven mils of the color resin. After curing and demolding the panels, the difference between the present coating and the standard coating were immediately recognizable. The haziness of the Standard Clear (Comparative Example A) was noticeable on the black panel. When comparing the color of the two black panels, the one fabricated with Experimental Clear (Example 1) was jet black whereas the Standard Clear looked gray. The haziness of the standard clear (Comparative Example A) reduced the appearance of the visual effect pigment also, making them seem less prevalent and providing an inferior visual effect coating. In contrast, the panels comprising the Experimental Clear (both with black and white base color layers) had an excellent visual effect, with a high degree of sparkle. The panel having the Standard Clear and white base color layer had a yellowish appearance, demonstrating superior clarity of the present coatings with a white base color layer.

These observations are also supported by the color readings of the Clear resins on over the black and white section of byko charts (#2810), in which the Experimental Clear and Standard Clear were drawn down on the charts and color measurements were taken.

Color measurements were made using a Datacolor International Spectraflash SF600® Plus CT color computer with Chroma-Calc® software. The setup for color measurements is as follows: Large area view (LAV); Specular reflections excluded; 10° lamp angle; and Hunter color coordinates. Color is measured in a three-dimensional color space with the dimensions being L, a, and b. 'L' indicates the degree of black and white. L values range from 0 (black) to 100 (white). 'a' indicates the degree of green and red. a values range from negative (green) to positive (red). 'b' indicates the degree of blue and yellow. b values range from negative (blue) to positive (yellow).

Color results for the Clear resins on the byko charts are reported as Delta E (DE), the total color change. This value is the square root of the sum of the squares of the differences between the initial and current L, a, and b values. Experimental White refers to the resin of Example 1 drawn down over the white section of the byko chart, while Experimental Black refers to the resin of Example 1 drawn down over the black section. Standard White and Black refer to the resin of Comparative Example A drawn down over the white and black sections, respectively, of the byko chart.

TABLE 5

Color Values for Visual Effect Panels

|  | L* | a* | b* |
|---|---|---|---|
| Experimental White | 94.28 | −0.63 | 3.55 |
| Standard White | 93.56 | −1.64 | 5.99 |
| Experimental Black | 25.60 | −0.12 | −0.68 |
| Standard Black | 26.52 | −0.19 | −1.04 |
|  | DE | DL* | Da* | Db* |
| Experimental vs Standard White | 3.13 | −0.49 | −1.01 | 2.44 |
| Experimental vs Standard Black | 1.37 | 1.27 | −0.07 | −0.36 |

These color values reflect the clarity of the clear gel coats applied to byko charts and can be used as a quantification of the clarity of the gel coat. A higher number for white indicates higher clarity; a lower number for black indicates lower clarity. The Experimental Clear resin (Example 1) had a clarity of at least 94 on a white portion of a byko chart and a clarity of less than 26 on the black portion of the byko chart, as measured by the Datacolor International Spectraflash instrument. These results demonstrate that the high clarity get coat layers and resins described herein have far superior clarity and color transmission compared to standard clear coats. The Experimental Clear has a far low level of yellow color (3.55 vs. 5.99) on the white portion, again demonstrating superior clarity of the present coatings with a white base color layer.

In view of this disclosure it is noted that the methods and apparatus can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims. All references cited herein are incorporated by reference in their entireties.

What is claimed is:

1. A multilayer coating having a visual effect, the coating comprising:
    a. a high clarity gel coat layer comprising an unsaturated polyester and a thixotropic agent having a size and surface that does not significantly impair the clarity of the gel coat layer;
    b. a visual effect layer comprising a clear gel coat and a visual effect pigment; and
    c. a color layer comprising a gel coat and a simple pigment.

2. The multilayer coating of claim 1, wherein the visual effect is selected from the group consisting of sparkle, metallic effect, pearlescent effect, gloss, distinctness of image, coarseness, glint, glitter, texture, or a combination thereof.

3. The multilayer coating of claim 1, wherein the visual effect is sparkle.

4. The multilayer coating of claim 1, wherein the visual effect pigment is a metal-coated glass particle.

5. The multilayer coating of claim 4, wherein the visual effect pigment has a particle size distribution of 35-150 microns.

6. The multilayer coating of claim 1, wherein the high clarity gel coat layer comprises silica in an amount that is less than 2% by weight.

7. The multilayer coating of claim 1, wherein the high clarity gel coat layer comprises silica having a BET surface area of 260-350 $m^2/g$.

8. The multilayer coating of claim 1, wherein the high clarity gel coat layer has a clarity of at least 94 on a white portion of a byko chart and/or a clarity of less than 26 on the black portion of a byko chart.

9. The multilayer coating of claim 1, wherein the high clarity gel coat layer is formed by curing an unsaturated polyester resin containing styrene monomer and (meth) acrylic acid and/or an alkyl (meth)acrylate.

10. The multilayer coating of claim 1, wherein one or more of the high clarity gel coat layer, the visual effect layer, or the color layer comprises one or more phthalate containing polyesters, vinyl containing polyesters or methyl methacrylate containing polyesters.

11. A method of manufacturing a multilayer coating having a visual effect, the method comprising:
    applying a high clarity gel coat resin as a layer to a mold, wherein the resin is a high clarity gel coat resin comprising a thixotropic agent having a size and surface that does not significantly impair the clarity of the gel coat layer;
    applying a visual effect resin directly or indirectly to the clear gel coat resin layer to form a visual effect layer;
    applying a color resin directly or indirectly to the visual effect layer to form a color layer.

12. The method of claim 11, wherein the high clarity gel coat resin is at least partially cured before the visual effect resin is applied.

13. The method of claim 11, wherein the visual effect resin is at least partially cured before the color resin is applied.

14. The method of claim 11, wherein the high clarity gel coat resin, the visual effect resin, and the color resin are applied by spraying.

15. The method of claim 11, further comprising applying a thermosetting resin or a thermoplastic resin to the color layer.

16. The method of claim 11, further comprising adhering the multilayer coating to a substrate to form an article.

17. The method of claim 16, wherein the substrate is a surface of selected from the group consisting of watercrafts, wind mills, swimming pools, tubs, showers, sanitary ware, tanks, pipes, ducts, fume stacks, build panels, ships, electrical parts, aircraft components, and electronic components.

18. An article coated with the multilayer coating of claim 1.

19. A visual effect gel coat resin comprising from 70 to 90 wt % high clarity gel coat resin and less than 2% at least one silica having a BET surface area of 260-350 $m^2/g$, based on the total weight of the composition.

20. The visual effect get coat resin of claim 19, wherein the resin comprising at least one unsaturated polyester resin.

\* \* \* \* \*